(12) United States Patent
Fredenburg

(10) Patent No.: US 10,654,324 B2
(45) Date of Patent: May 19, 2020

(54) AIRLESS FLEXIBLE TIRE WITH TORQUE REDUCING TRACK PATTERN

(71) Applicant: LINDSAY CORPORATION, Omaha, NE (US)

(72) Inventor: Michael Fredenburg, Hickman, NE (US)

(73) Assignee: Lindsay Corporation, Omaha, NE (US)

( * ) Notice: Subject to any disclaimer, the term of this patent is extended or adjusted under 35 U.S.C. 154(b) by 192 days.

(21) Appl. No.: 15/822,855

(22) Filed: Nov. 27, 2017

(65) Prior Publication Data

US 2019/0160896 A1 May 30, 2019

(51) Int. Cl.
| | |
|---|---|
| *B60C 27/02* | (2006.01) |
| *B60C 7/10* | (2006.01) |
| *B60C 11/04* | (2006.01) |
| *B60C 7/28* | (2006.01) |
| *B60C 11/03* | (2006.01) |

(52) U.S. Cl.
CPC ............ *B60C 27/0223* (2013.01); *B60C 7/10* (2013.01); *B60C 7/28* (2013.01); *B60C 11/04* (2013.01); *B60C 2007/107* (2013.01); *B60C 2011/0346* (2013.01); *B60C 2200/08* (2013.01)

(58) Field of Classification Search
CPC ....... B60C 27/0223; B60C 11/04; B60C 7/10; B60C 2011/0346

USPC ........................................................ 152/246
See application file for complete search history.

(56) References Cited

U.S. PATENT DOCUMENTS

| | | | |
|---|---|---|---|
| 2,403,812 A | 7/1946 | Ronald | |
| 8,020,943 B2 | 9/2011 | Kipp | |
| 2011/0121090 A1 | 5/2011 | Price | |
| 2013/0284861 A1* | 10/2013 | Korus | ................... A01G 25/092 248/49 |
| 2014/0083586 A1* | 3/2014 | Korus | ...................... B60O 7/10 152/301 |
| 2015/0202917 A1* | 7/2015 | Korus | ....................... B60B 9/04 152/5 |

* cited by examiner

*Primary Examiner* — S. Joseph Morano
*Assistant Examiner* — Jean W Charleston
(74) *Attorney, Agent, or Firm* — Hovey Williams LLP

(57) ABSTRACT

An airless flexible tire comprising a belt, drive lugs, and traction lugs. The drive lugs extend inwardly from the belt and form annularly spaced, rigid, high torque points. The traction lugs extend outwardly from the belt and are annularly offset from the drive lugs so as to form flexible sections that deflect radially inwardly when the tire engages the ground. Each traction lug has an effective height as a function of its actual height, the angle that the traction lug extends relative to a radial axis, the angle of the traction lug's distal surface, and the amount the tire deflects radially inwardly near the traction lug so as to at least partially equalize a rolling radius of the wheel to reduce torque generated near the high torque points.

16 Claims, 4 Drawing Sheets

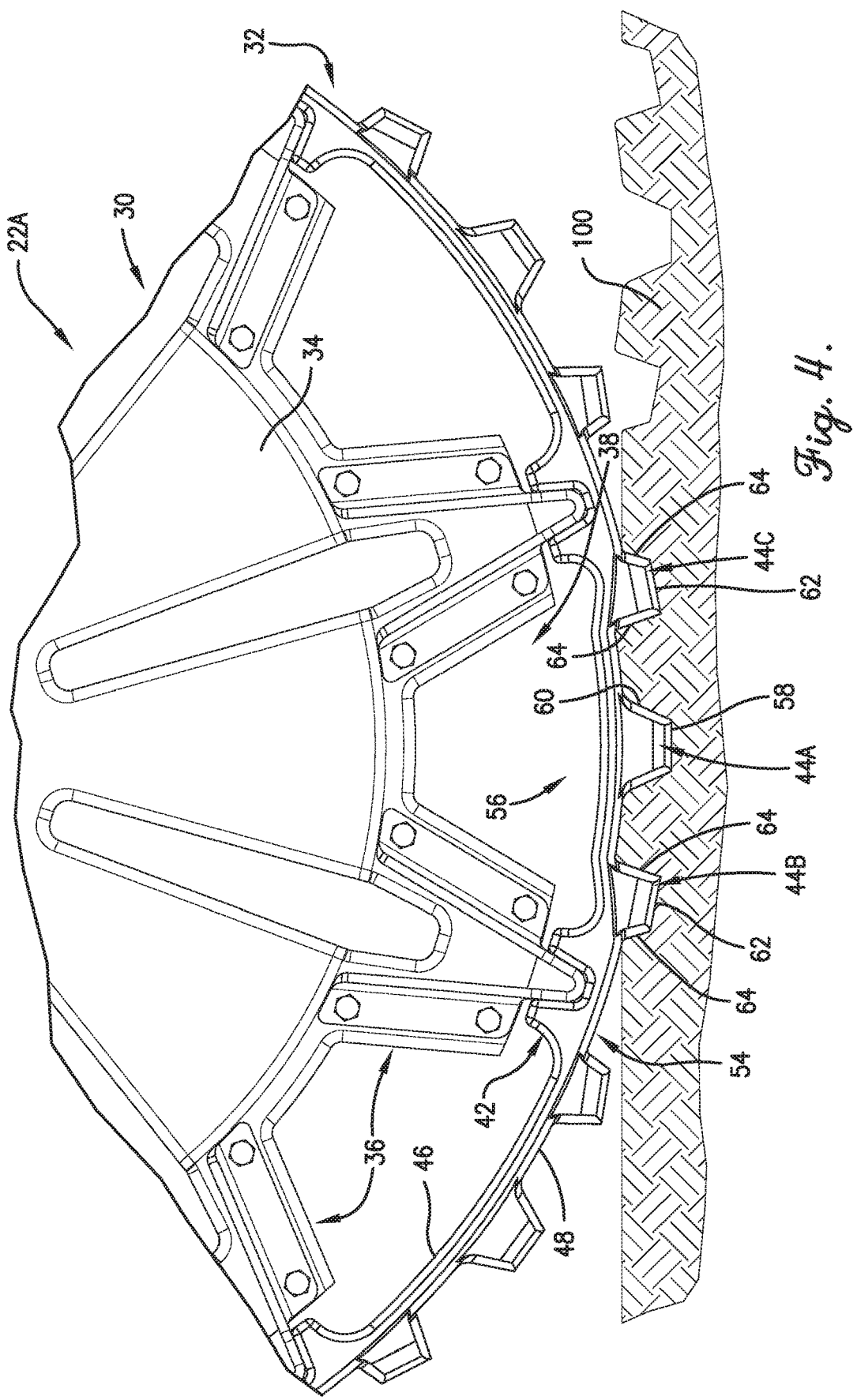

AIRLESS FLEXIBLE TIRE WITH TORQUE REDUCING TRACK PATTERN

BACKGROUND

Figure 1:
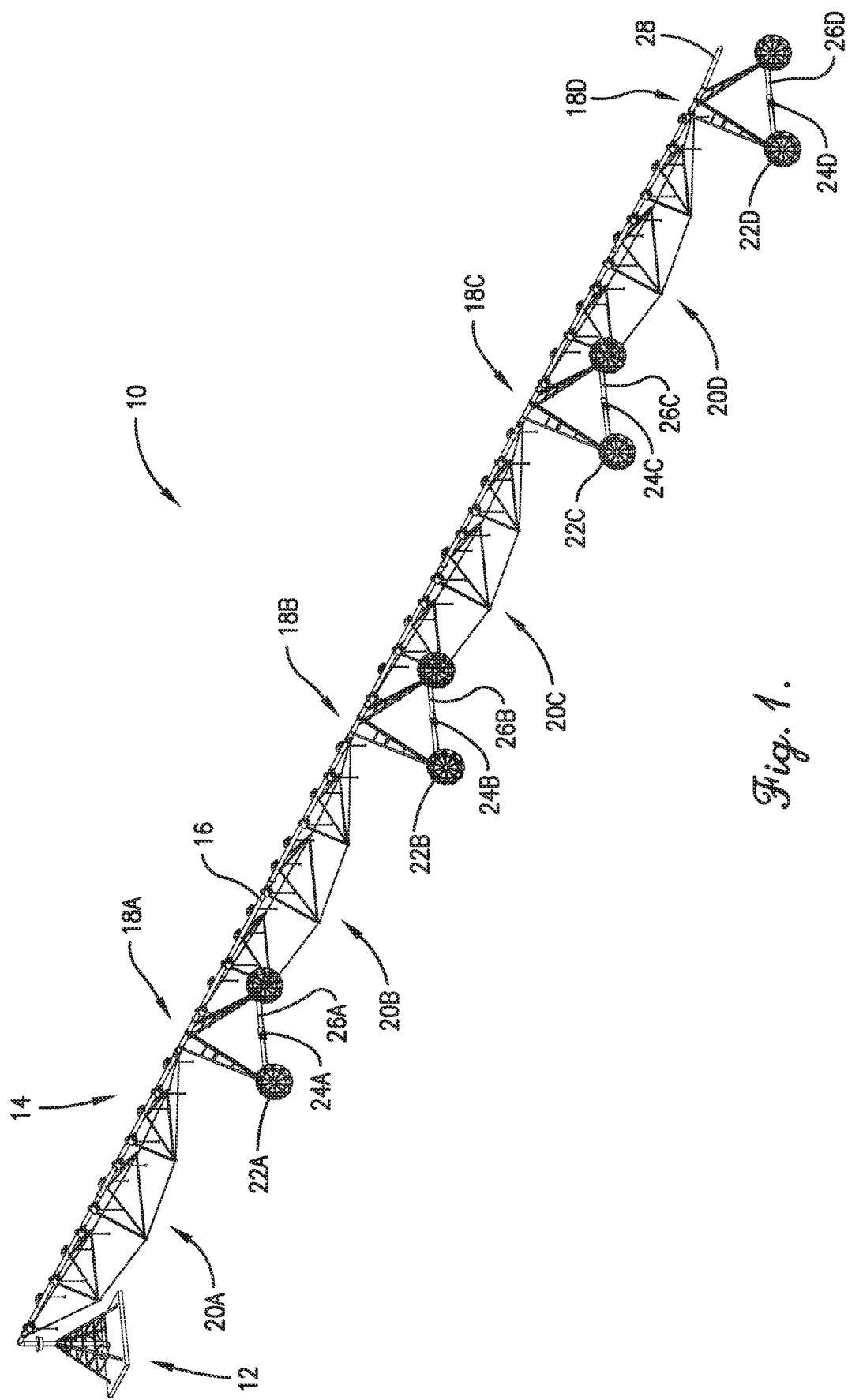

Movable agricultural irrigation systems such as center-pivot and linear systems are commonly used to irrigate large fields and typically include a conduit extending across several irrigation spans. Each irrigation span supports a conduit section elevated on a support tower including wheel assemblies configured to traverse a path along the ground for moving the conduit across the fields. The wheel assemblies may include conventional pneumatic tires or "airless" tires. In the airless tire embodiments, the wheel assemblies typically include a rigid wheel and an airless flexible tire mounted thereon. The rigid wheel has spaced apart outwardly protruding spokes so as to form a polygon shape or other non-circular shape. The airless flexible tire has rigid sections aligned with the outwardly protruding spokes and flexible sections configured to be deflected inwardly between the outwardly protruding spokes when the flexible sections engage the ground. The airless flexible tire exerts higher torque on the ground near the outwardly protruding spokes. However, in certain applications and field conditions, a lower maximum torque or a more evenly distributed torque profile is desired. Switching out wheel assemblies according to the desired maximum torque or torque profile is highly impractical and prohibitively expensive even if the change is permanent. For this reason, farmers usually opt to continue using the high torque wheel assemblies. This results in excessive field wear and fatigue on the drive motor and other moving parts of the irrigation spans.

SUMMARY

The present invention solves the above-described and other problems and limitations by providing an improved airless flexible tire for covering a wheel of an irrigation system.

The airless flexible tire may be configured for mounting on a rigid wheel having a central hub and a number of tire supports. The central hub is configured to be attached to an axle of a mobile support tower of the irrigation system. The tire supports may be mounting bosses or other radially extending protrusions, fasteners, or separate components radially attached to the central hub via fasteners or interlocking geometry.

The airless flexible tire broadly comprises a circular belt, a number of drive lugs, and a number of traction lugs. The circular belt includes an inner face, an outer face, and left and right sidewalls extending between the inner face and outer face. The circular belt may also include reinforcing elements, such as fabric webbing or annular steel bands, that limit stretch and strengthen the airless flexible tire.

The drive lugs extend radially inwardly from the inner face of the circular belt and are annularly spaced from each other for engaging the tire supports of the rigid wheel. The drive lugs form a plurality of annularly spaced, rigid, high torque points on the airless flexible tire near the tire supports of the rigid wheel, a primary goal of the present invention being to reduce the high torque generated at the high torque points or to equalize the torque generated by the wheel assembly, as explained below. The drive lugs may be integrally formed with the circular belt and may include complementary geometry, such as an H-shaped rib, for securing the airless flexible tire on the rigid wheel.

The traction lugs extend radially outwardly from the outer face of the circular belt and are annularly offset from the drive lugs so as to be positioned between the tire supports of the wheel. The traction lugs and underlying portions of the circular belt form a number of annularly spaced flexible sections on the airless flexible tire configured to deflect radially inwardly when the traction lugs engage the ground surface. The traction lugs include a central traction lug and two offset traction lugs. The central traction lug is positioned equidistant between adjacent drive lugs and includes a distal surface and a number of side surfaces. The distal surface is substantially level (i.e., perpendicular to the radial axis extending through the central traction lug) and symmetric about the radial axis. The side surfaces are drafted at different angles for maintaining traction as the airless flexible tire rolls across the ground surface.

The offset traction lugs are positioned on either side of the central traction lug and are substantially identical. Each offset traction lug includes a distal surface and a number of side surfaces. The distal surface is tapered between 1 degree and 45 degrees towards the nearest drive lug from a radial axis extending through the offset traction lug. The side surfaces are drafted at different angles for maintaining traction as the airless flexible tire rolls across the ground surface. The offset traction lug may extend at an angle between 1 degree and 45 degrees towards the nearest drive lug from the radial axis.

In use, the airless flexible tire engages a layer of compliant soil as the rigid wheel traverses a path along the ground surface. More specifically, the tire supports of the rigid wheel urge the high torque points into the soil while the flexible sections are deflected into the recesses between the tire supports so as to form a generally corrugated track of alternating peaks and valleys. The central traction lugs grip peaks of the corrugated track and the offset traction lugs grip sides of the peaks as the flexible sections are deflected into the recesses.

Each traction lug is urged radially inwardly according to its position on the flexible section since the flexible section bends into a concave or arched shape. For example, the central traction lug is urged radially inwardly with little to no rotation since it is positioned at the center of the flexible section. The offset traction lugs are urged radially inwardly less than the central traction lug while at least partially rotating around the nearest high torque point. The offset traction lugs become substantially upright relative to the ground surface as they rotate around the nearest high torque point due to the angle at which the offset traction lugs extend from the flexible section. At the same time, the distal surface of the offset traction lugs becomes substantially level with the ground surface due to the angle of the distal surface relative to the flexible section.

Each traction lug has an effective height as a function of its actual height, the angle that the traction lug extends relative to a radial axis, the angle of the traction lug's distal surface, and the amount that the flexible section deflects near the traction lug. For example, the central traction lug may be taller than the offset traction lugs, but the flexible section deflects inwardly a greater amount near the central traction lug than near the offset traction lugs. Thus, the effective heights of the traction lugs may be substantially equal even though their actual heights are different. The traction lugs are also spaced from the high torque points since the high torque points do not deflect inward. In this way, the traction lugs at least partially equalize a rolling radius of the wheel such that torque generated near the high torque points is reduced. In one embodiment, the traction lugs effect an equalized rolling radius of the wheel such that the traction lug soil imprints have a consistent depth as the airless flexible tire traverses the ground surface. Alternatively, the traction lugs may form a sine curve profile or any other suitable profile in the soil.

The above-described airless flexible tire provides several advantages over conventional airless tires. For example, the traction lugs at least partially equalize the rolling radius of the wheel, which decreases the torque generated at the high-torque points. The traction lugs form a corrugated profile in the soil, which helps prevent erosion. The traction lugs may also form a sine curve profile or any other suitable profile, which further limits soil erosion. The traction lugs may be spaced from each other at least one half of a lug width for improving soil shedding when the traction lugs are not contacting the ground surface. The side surfaces of the traction lugs are drafted for further improving soil shedding and increasing a contact angle between the traction lugs and the soil.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
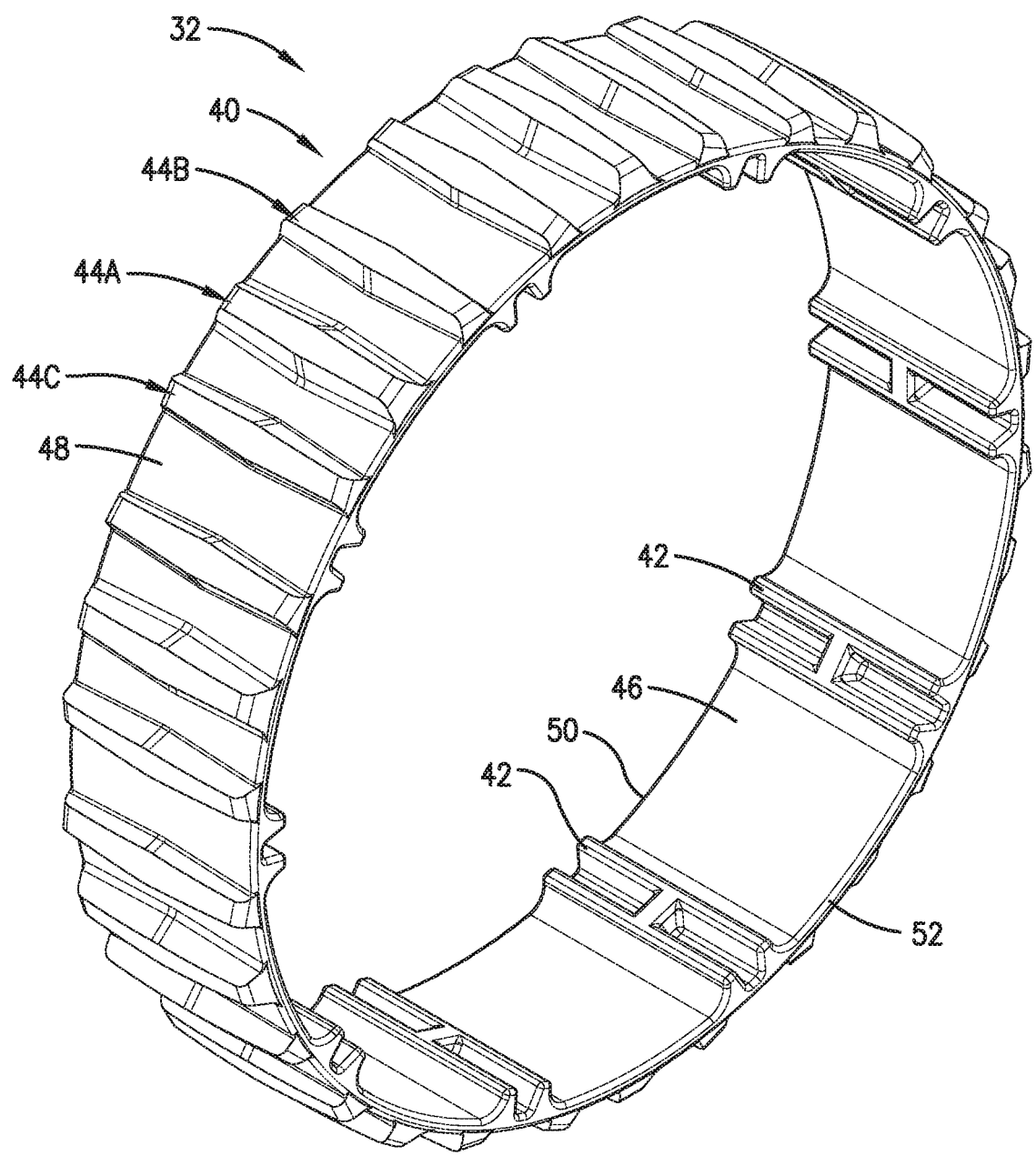
Figure 3:
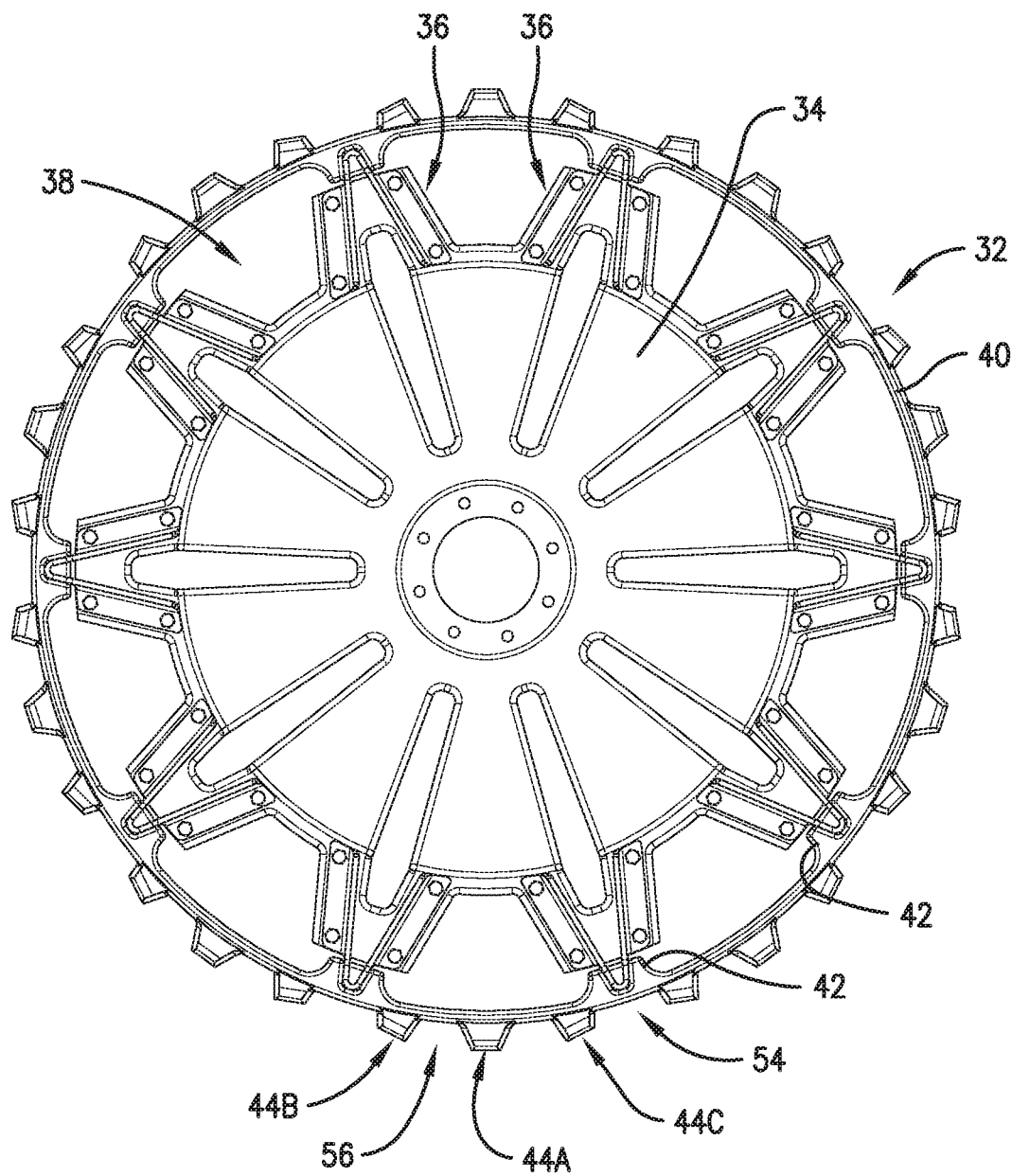

Embodiments of the present invention are described in detail below with reference to the attached drawing figures, wherein:

FIG. 1 is a perspective view of an irrigation system on which wheel assemblies including airless flexible tires constructed in accordance with an embodiment of the invention may be mounted;

FIG. 2. is a perspective view of an airless flexible tire constructed in accordance with an embodiment of the invention;

FIG. 3 is a side elevation view of the airless flexible tire of FIG. 2 mounted on a rigid wheel; and FIG. 4 is an enlarged partial side elevation view of the airless flexible tire of FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 is illustrated including a plurality of wheel assemblies constructed in accordance with embodiments of the invention. The illustrated irrigation system 10 is a central pivot irrigation system broadly comprising a fixed central pivot 12 and a main section 14 pivotally connected to the central pivot 12. The irrigation system 10 may also comprise an extension arm (also commonly referred to as a "swing arm" or "corner arm") pivotally connected to the free end of the main section 14.

The fixed central pivot 12 may be a tower or any other support structure about which the main section 14 may pivot. The central pivot 12 draws from a well, water tank, or other source of water and may also be coupled with a tank or other source of agricultural products to inject fertilizers, pesticides and/or other chemicals into the water for application during irrigation. The central pivot 12 may supply water to a conduit 16 which carries the water along the length of the main section 14.

The main section 14 may comprise a number of mobile support towers 18A-D, the outermost 18D of which is referred to herein as an "end tower". The mobile support towers 18A-D are connected to the fixed central pivot 12 and to one another by truss sections 20A-D or other supports to form a number of interconnected spans. The irrigation system 10 illustrated in FIG. 1 includes four mobile support towers 18A-D; however, it may comprise any number of mobile support towers without departing from the scope of the present invention.

Each mobile support tower may include a pair of wheel assemblies 22A-D and one or more drive motors 24A-D mounted on a drive tube 26A-D. Embodiments of the wheel assemblies 22A-D are described in more detail below. The drive motors 24A-D may include integral or external relays so they may be turned on, off, and reversed. The drive motors 22A-D may have several speeds or may be equipped with variable speed drives and may be turned on, off, and reversed.

Each truss section 18A-D carries or otherwise supports conduit 16 or other fluid distribution mechanism. A plurality of sprinkler heads, spray guns, drop nozzles, or other fluid-emitting devices are spaced along the conduit 16 to apply water and/or other fluids to land underneath the irrigation system.

The irrigation system 10 may also include an optional extension arm pivotally connected to the end tower 18D and supported by a swing tower with steerable wheels driven by a drive motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 18D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22A-D described in detail below. Other, equally preferred implementations of the wheel assemblies 22A-D not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over un-paved or un-finished ground.

Referring now to FIGS. 2-4, a wheel assembly 22A constructed in accordance with embodiments of the invention is illustrated. The wheel assembly 22A broadly comprises a rigid wheel 30 and an airless flexible tire 32 mounted thereon. The rigid wheel 30 includes a central hub 34 and a plurality of tire supports 36. The central hub 34 is configured to be mounted on or fastened to an axle of the mobile support tower 18A. The tire supports 36 extend radially outwardly from the central hub 34 and are annularly spaced from each other so as to form recesses 38 therebetween. The recesses 38 may be pronounced or may extend only slightly inwardly relative to the tire supports 36. For example, in one embodiment, the rigid wheel 30 has a polygonal shape with the tire supports 36 being points of the polygon shape and the regions between the tire supports 36 being sides of the polygon shape. The tire supports 36 may be mounting bosses or other radially extending protrusions or may be separate components such as mounting elements radially attached to the central hub 34 via fasteners or interlocking geometry. The rigid wheel 30 may include between six and twenty tire supports 36. In one embodiment, the rigid wheel 30 includes ten tire supports 36.

The airless flexible tire 32 is configured to be mounted on the rigid wheel 30 and broadly comprises a circular belt 40, a plurality of drive lugs 42, and a plurality of traction lugs 44A-C. The circular belt 40 includes an inner face 46, an outer face 48, and left and right sidewalls 50, 52 extending between the inner face 46 and outer face 48. The circular belt 40 may also include reinforcing elements, such as fabric webbing or annular steel bands, that limit stretch and strengthen the airless flexible tire 32.

The drive lugs 42 extend radially inwardly from the inner face 46 of the circular belt 40 and are annularly spaced from each other for engaging the tire supports 36 of the rigid wheel 30. The drive lugs 42 form a plurality of annularly spaced, rigid, high torque points 54 on the airless flexible tire 32 near the tire supports 36 of the rigid wheel 30, a primary goal of the present invention being to reduce the high torque generated at the high torque points 54 or to equalize the torque generated by the wheel assembly 22A as explained in more detail below. The drive lugs 42 may be integrally formed with the circular belt 40 and may include complementary geometry, such as an H-shaped rib, for securing the airless flexible tire 32 on the rigid wheel 30.

The traction lugs 44A-C extend radially outwardly from the outer face 48 of the circular belt 40 and are annularly offset from the drive lugs 42 so as to be positioned between the tire supports 36 of the rigid wheel. The traction lugs 44A-C and the underlying portions of the circular belt 40 form a plurality of annularly spaced flexible sections 56 on the airless flexible tire 32 configured to deflect radially inwardly when the traction lugs 44A-C engage the ground surface 100. The traction lugs 44A-C may include a central traction lug 44A and/or offset traction lugs 44B,C. The central traction lug 44A is positioned equidistant between adjacent drive lugs 42 and includes a distal surface 58 and a plurality of side surfaces 60. The distal surface 58 may be substantially level (i.e., perpendicular to a radial axis extending through the central traction lug 44A) and/or symmetric about the radial axis. The side surfaces 60 may be drafted at different angles for maintaining traction as the airless flexible tire 32 rolls across the ground surface 100. The central traction lug 44A may be taller than the offset traction lugs 44B,C.

The offset traction lugs 44B,C are positioned on either side of the central traction lug 44A or otherwise off-center between the adjacent drive lugs 42 and are substantially identical so only offset traction lug 44B will be described in detail. Offset traction lug 44B includes a distal surface 62 and a plurality of side surfaces 64. The distal surface 62 may be tapered or angled between 1 degree and 45 degrees towards the nearest drive lug 42 from a radial axis extending through the offset traction lug 44B. The side surfaces 64 may be drafted at different angles for maintaining traction as the airless flexible tire 32 rolls across the ground surface 100. The offset traction lug 44B may extend at an angle between 1 degree and 45 degrees towards the nearest drive lug 42 from the radial axis.

The above-described traction lugs 44A-C may form face-on traction lug patterns and may have other attributes in conjunction with the above-described features. For example, the traction lugs 44A-C may form a directional or non-directional Z-tread pattern, zig-zag pattern, angled pattern, curved or straight pattern, or any other suitable tread pattern for improving traction and reducing soil erosion.

In use, the airless flexible tire 32 engages a layer of compliant soil as the rigid wheel 30 traverses a path along the ground surface 100. More specifically, the tire supports 36 of the rigid wheel 30 urge the high torque points 54 into the soil while the flexible sections 56 are deflected into the recesses 38 between the tire supports 36 so as to form a generally corrugated track of alternating peaks and valleys. The central traction lugs 44A grip peaks of the corrugated track and the offset traction lugs 44B,C grip sides of the peaks as the flexible sections 56 are urged into the recesses 38. The drafted side surfaces 60, 64 of the traction lugs 44A-C maintain traction as the airless flexible tire 32 rolls across the ground surface 100.

Each traction lug 44A-C is urged radially inwardly according to its position on the flexible section 56 since the flexible section 56 bends into a concave or arched shape. For example, the central traction lug 44A is urged radially inwardly with little to no rotation since it is positioned at the center of the flexible section 56. The offset traction lugs 44B,C are urged radially inwardly less than the central traction lug 44A while at least partially rotating around the nearest high torque point 54. The offset traction lugs 44B,C become substantially upright relative to the ground surface 100 as they rotate around the nearest high torque point 54 due to the angle at which the offset traction lugs 44B,C extend from the flexible section 56. At the same time, the distal surfaces 62 of the offset traction lugs 44B,C become substantially level with the ground surface 100 due to the angle of the distal surface 62 relative to the flexible section 56.

Each traction lug 44A-C has an effective height as a function of its actual height, the angle that the traction lug 44A-C extends relative to a radial axis, the angle of the traction lug's distal surface 58, 62, and the amount that the flexible section 56 deflects near the traction lug 44A-C. For example, the central traction lug 44A may be taller than the offset traction lugs 44B,C, but the flexible section 56 deflects inwardly a greater amount near the central traction lug 44A than near the offset traction lugs 44B,C. Thus, the effective heights of the traction lugs 44A-C may be substantially equal. The traction lugs 44A-C are also spaced from the high torque points 54 since the high torque points 54 do not deflect inward. In this way, the traction lugs 44A-C at least partially equalize a rolling radius of the wheel 30 such that torque generated near the high torque points 54 is reduced. In one embodiment, the traction lugs 44A-C effect an equalized rolling radius of the wheel 30 such that the traction lug soil imprints have a consistent depth as the airless flexible tire 32 traverses the ground surface 100. Alternatively, the traction lugs 44A-C may form a sine curve profile or any other suitable profile in the soil.

The above-described airless flexible tire 32 provides several advantages over conventional airless tires. For example, the traction lugs 44A-C at least partially equalize the rolling radius of the wheel 30, which decreases the torque generated at high-torque points 54. The traction lugs 44A-C form a corrugated profile in the soil, which helps prevent erosion. The traction lugs 44A-C may also form a sine curve profile or any other suitable profile, which further limits soil erosion. The traction lugs 44A-C may be spaced from each other at least one half of a lug width for improving soil shedding when the traction lugs 44A-C are not contacting the ground surface 100. The side surfaces 60, 64 of the traction lugs 44A-C are drafted at different angles for maintaining traction as the airless flexible tire 32 rolls across the ground surface 100.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An airless flexible tire for covering a wheel having a number of annularly spaced and outwardly extending tire supports, the airless flexible tire comprising:
    a circular belt having an inner face, an outer face, and left and right sidewalls between the inner face and outer face;
    a plurality of annularly spaced drive lugs extending inwardly from the inner face of the circular belt and each configured to align with and engage one of the tire supports on the wheel so as to form a plurality of annularly-spaced, rigid, high torque points on the airless flexible tire; and
    a plurality of annularly spaced traction lugs extending outwardly from the outer face of the circular belt, the traction lugs being annularly offset from the drive lugs so as to be positioned between the tire supports to form a plurality of annularly-spaced flexible sections on the airless flexible tire that deflect radially inwardly when the traction lugs engage a ground surface, each traction lug having an effective height corresponding to an amount the airless flexible tire deflects radially inwardly such that a rolling radius of the wheel is at least partially equalized so as to reduce an amount of torque generated at the high torque points,
    wherein the traction lugs are grouped such that each group includes:
        a central traction lug annularly spaced equidistant from adjacent drive lugs; and
        two offset traction lugs annularly spaced on either side of the central traction lug, each traction lug having a distal surface,
        wherein the distal surface of each offset traction lug is angled towards the nearest drive lug so as to be substantially level with the ground surface when the distal surface is in contact with the ground surface at the bottom of a tire rotation and the airless flexible tire is deflected inward.

2. The wheel assembly of claim 1, wherein each group includes a single central traction lug annularly spaced equidistant from adjacent drive lugs and exactly two offset traction lugs annularly spaced on either side of the central traction lug.

3. The wheel assembly of claim 2, wherein the offset traction lugs extend at an angle between 1 degree and 45 degrees from a radial axis so as to extend perpendicular to the ground surface when the distal surfaces of the offset traction lugs contact the ground surface and the airless flexible tire is deflected inward.

4. The wheel assembly of claim 1, wherein the traction lugs have side surfaces drafted at different angles for maintaining traction with the ground surface.

5. The wheel assembly of claim 1, wherein the traction lugs are configured to form a corrugated profile in soil of the ground surface for limiting soil erosion.

6. The wheel assembly of claim 1, wherein the traction lugs are configured to form a sine curve profile in soil of the ground surface for limiting soil erosion.

7. The wheel assembly of claim 1, wherein the traction lugs are spaced from each other at least a distance of one half of a traction lug width for improving soil shedding when the traction lugs are not contacting the ground surface.

8. A wheel assembly for traversing a path along a ground surface having a layer of soil, the wheel assembly comprising:
    a rigid wheel having a plurality of annularly spaced and outwardly extending tire supports; and
    an airless flexible tire comprising:
        a circular belt having an inner face, an outer face, and left and right sidewalls between the inner face and outer face;
        a plurality of annularly spaced drive lugs extending inwardly from the inner face of the circular belt and each configured to align with and engage one of the tire supports on the wheel so as to form a plurality of annularly-spaced, rigid, high torque points on the airless flexible tire; and
        a plurality of annularly spaced traction lugs extending outwardly from the outer face of the circular belt, the traction lugs being annularly offset from the drive lugs so as to be positioned between the tire supports to form a plurality of annularly-spaced flexible sections on the airless flexible tire that deflect radially inwardly when the traction lugs engage a ground surface, each traction lug having an effective height corresponding to an amount the airless flexible tire deflects radially inwardly such that a rolling radius of the wheel is at least partially equalized so as to reduce an amount of torque generated at the high torque points, wherein the traction lugs are grouped such that each group includes:
- a central traction lug annularly spaced equidistant from adjacent drive lugs; and
- two offset traction lugs annularly spaced on either side of the central traction lug, each traction lug having a distal surface,
- wherein the distal surface of each offset traction lug is angled towards the nearest drive lug so as to be substantially level with the ground surface when the distal surface is in contact with the ground surface at the bottom of a tire rotation and the airless flexible tire is deflected inward.

9. The wheel assembly of claim 8, wherein the tire supports are mounting elements, the drive lugs forming H-shaped ribs for engaging the mounting elements.

10. The wheel assembly of claim 8, wherein the wheel has a polygon shape such that the tire supports form points of the polygon.

11. The wheel assembly of claim 8, wherein each group includes a single central traction lug annularly spaced equidistant from adjacent drive lugs and exactly two offset traction lugs annularly spaced on either side of the central traction lug.

12. The wheel assembly of claim 11, wherein the offset traction lugs extend at an angle between 1 degree and 45 degrees from a radial axis so as to extend perpendicular to the ground surface when the distal surfaces of the offset traction lugs contact the ground surface and the airless flexible tire is deflected inward.

13. The wheel assembly of claim 11, wherein the traction lugs have side surfaces drafted at different angles for maintaining traction with the ground surface.

14. The wheel assembly of claim 8, wherein the traction lugs are configured to form a corrugated profile in soil of the ground surface for limiting soil erosion.

15. The wheel assembly of claim 8, wherein the traction lugs are configured to form a sine curve profile in soil of the ground surface for limiting soil erosion.

16. A wheel assembly for traversing a path along a ground surface having a layer of soil, the wheel assembly comprising:
- a rigid polygon-shaped wheel having a plurality of annularly spaced and outwardly extending tire supports forming points of the polygon; and
- an airless flexible tire mounted on the central hub, the airless flexible tire comprising:
  - a circular belt having an inner face, an outer face, and left and right sidewalls between the inner face and outer face;
  - a plurality of annularly spaced drive lugs extending inwardly from the inner face of the circular belt and each configured to align with and engage one of the tire supports on the wheel so as to form a plurality of annularly-spaced, rigid, high torque points on the airless flexible tire; and
  - a plurality of annularly spaced traction lugs extending outwardly from the outer face of the circular belt, the traction lugs being divided into groups, each group being annularly offset from the drive lugs and including:
    - a central traction lug spaced equidistant from adjacent drive lugs; and
    - two offset traction lugs annularly spaced from the central traction lug, the offset traction lugs extending at an angle between 1 degree and 45 degrees from a radial axis such that the offset traction lugs extend perpendicular to the ground surface when the airless flexible tire is deflected,
  - each traction lug having an effective height corresponding to an amount the airless flexible tire deflects radially inwardly near the traction lug when the traction lug engages the ground surface such that a rolling radius of the wheel is at least partially equalized so as to reduce an amount of torque generated at the high torque points,
- wherein the traction lugs are grouped such that each group includes:
  - a central traction lug annularly spaced equidistant from adjacent drive lugs; and
  - two offset traction lugs annularly spaced on either side of the central traction lug, each traction lug having a distal surface,
  - wherein the distal surface of each offset traction lug is angled towards the nearest drive lug so as to be substantially level with the ground surface when the distal surface is in contact with the ground surface at the bottom of a tire rotation and the airless flexible tire is deflected inward.

* * * * *